W. C. LINDSAY.
FUEL AND AIR SUPPLYING APPARATUS.
APPLICATION FILED DEC. 30, 1919.
1,349,465.
Patented Aug. 10, 1920.
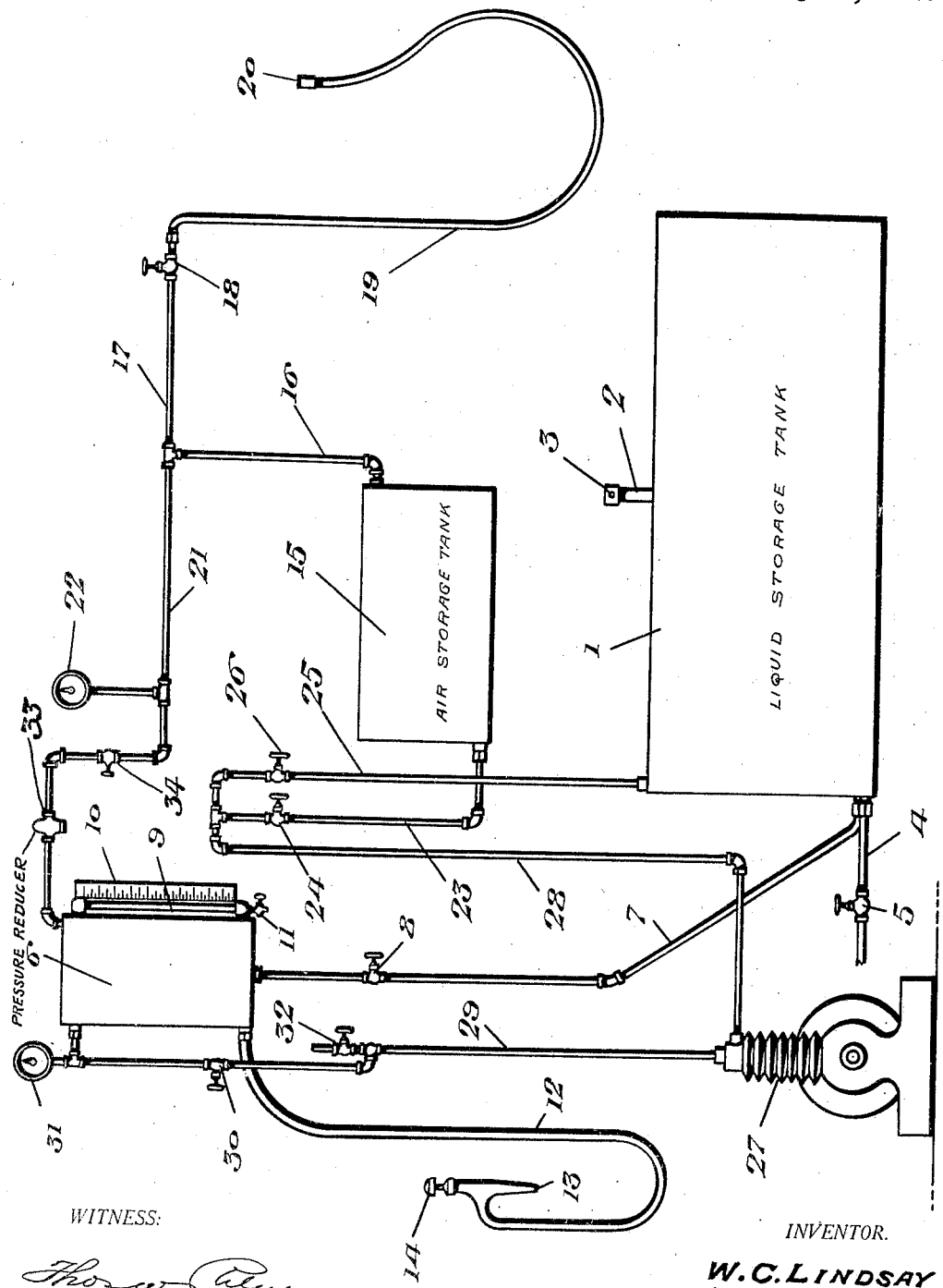
WITNESS:
INVENTOR.
W. C. LINDSAY
BY
ATTORNEY.

UNITED STATES PATENT OFFICE.

WILLIAM C. LINDSAY, OF NEWPORT, VERMONT.

FUEL AND AIR SUPPLYING APPARATUS.

1,349,465. Specification of Letters Patent. Patented Aug. 10, 1920.

Application filed December 30, 1919. Serial No. 348,427.

*To all whom it may concern:*

Be it known that I, WILLIAM C. LINDSAY, a citizen of the United States, residing at Newport city, in the county of Orleans and State of Vermont, have invented certain new and useful Improvements in Fuel and Air Supplying Apparatus; and I do hereby declare the following to be a full, clear, and exact description of the invention, such as will enable others skilled in the art to which it appertains to make and use the same.

The present invention relates to a fuel and air supplying apparatus for use in automobile service stations, garages and the like, and aims to provide a novel and improved, yet simple and inexpensive dual system for supplying gasolene or other fuel or liquid to the customer, and for also supplying compressed air for inflating tires, blowing out plugged oil pipes of automobile engines, and the like.

It is the object of the invention to provide such an apparatus utilizing a single air pump or compressor for both feeding the fuel or liquid into a measuring tank from which it is delivered by gravity or pressure to the automobile tank or other receiver, and for also compressing air to be used for inflating tires and other purposes.

Another object is to provide such an arrangement which will provide for efficiency as well as economy, eliminating expensive apparatus now in use, and providing for economy in installation and maintenance, in that the apparatus is of simple construction and only utilizes an air pump or compressor driven by an electric motor or other prime mover as operative mechanism.

With the foregoing and other objects in view, which will be apparent as the description proceeds, the invention resides in the construction and arrangement of parts hereinafter described and claimed, it being understood that changes can be made within the scope of what is claimed, without departing from the spirit of the invention.

The invention is illustrated in the accompanying drawing, where the figure is a diagrammatical view of the apparatus.

The apparatus embodies a storage tank 1 for the gasolene, fuel or other liquid, which can be buried in the ground or otherwise arranged, and which has a filling pipe or neck 2 with a removable cap 3, said cap having an air vent of restricted size to avoid the accumulation of pressure in the tank yet preventing unrestricted passage of air into or out of the tank. Said tank 1 also has a drain pipe 4 with a controlling valve 5, which when opened will drain the tank.

A suitable measuring tank 6 is disposed in an elevated position for the flow of fuel or liquid therefrom by gravity, or pressure as the case may be, and a liquid supply pipe 7 leads from the lower portion of the tank 1 to the bottom of the measuring tank 6 and has a manual shut off valve 8. The tank 6 is equipped at one side with a glass gage 9 and a graduated scale 10 for indicating the amount of liquid in said tank 6, and to facilitate filling said tank with a desired quantity of liquid. The gage 9 has a drain cock 11 at its lower end. A discharge hose 12 leads from the bottom of the tank 6 for delivering the liquid by gravity or pressure, as the case may be, into the tank of the automobile or other receiver, said hose 12 being flexible and having a discharge nozzle and valve 13 at its free end for delivering the liquid into the tank, and controlling such flow, said valve having a push button or plunger 14 to be operated by the hand to establish the flow after the nozzle has been inserted into the tank.

An air storage tank 15 is provided for storing compressed air, to be used in inflating tires, and the like, and a delivery pipe 16 leads from the tank 15 and has a branch 17 with a controlling valve 18, and a hose 19 leads from the branch 17 and is flexible to apply same to the valve stems of the tires or other devices for receiving the air. This hose 19 has an automatic valve 20 at its free end for normally shutting off the flow of air, and to establish the flow when said valve is applied to a tire valve stem or the like. The valve 18, however, can be normally closed to shut off the flow of air, and relieve the valve 20 of pressure. The pipe 16 has a second branch 21 to which a pressure gage 22 is connected for indicating the air pressure in the tank 15, and this branch 21 is connected to the upper portion of the tank 6. The branch 21 has an automatic pressure reducer valve 33 which allows only a restricted passage of air from the tank 15 to the tank 6 so as to reduce the air pressure in the tank 6 when used, and the branch 21 also has a manual shut off valve 34. By opening the valve 34 air is admitted under desired reduced pressure to the tank 6 from the tank 15 for displacing the liquid from the tank 6 through the hose 12 under pressure, which is especially desirable when the tank 6 is to be discharged into a container or receiver at a higher level or at some distance away. The valve 33 avoids the high air pressure of the tank 15 reaching the tank 6 and assures of a predetermined pressure in tank 6, according to the adjustment of said valve, when the valve 34 is opened.

An air pipe 23 having a manual shut off 24 therein is connected at one end to the tank 15, and at its other end to a pipe 25 leading to the upper portion of the tank 1, and said pipe 25 also has a manual shut off valve 26, for the flow of air through said pipes 23 and 25 from an air pump or compressor 27, which can be operated by an electric motor or other prime mover. An air pressure pipe 28 leads from the expulsion port of the air pump 27 and is connected to the pipes 23 and 25 at those sides of the valves 24 and 26 opposite to the tanks 15 and 1, respectively, whereby the air can be directed from the pump into the tank 1 by opening the valve 26 or into the tank 15 by opening the valve 24.

The air pump 27 is also employed for creating a vacuum in the measuring tank 6, for elevating the liquid by suction from the storage tank 1 into said measuring tank, and for this purpose an air suction pipe 29 is connected at one end of the suction port of the pump 27 and at its other end to the upper portion of the tank 6. Said pipe 29 is provided with a manual shut off valve 30, and a vacuum gage 31. The pipe 29 is also equipped with an atmospheric valve 32 for opening said pipe to the atmosphere, to let in air to the pump 27, or tank 6.

The present apparatus can be used under different conditions, thereby having a range of use to lend itself for duty in an efficient manner. By opening the valves 32 and 24 and closing valve 30, the pump 27 can be operated for supplying compressed air to the tank 15, in which the air is stored, the valve 24 then being closed when the pump is stopped. The valve 18 can then be opened and the valve 20 applied to the tire valve stems for inflating tires or the compressed air can be used for many other purposes, as will suggest themselves.

In delivering the fuel or liquid to the consumer, the valves 24 and 32 are closed and the valves 8, 26 and 30 opened, and the pump 27 is operated by setting its prime mover in operation to exhaust the air from the tank 6, and deliver air through the pipes 25 and 28 into the tank 1. The vacuum thus created in the tank 6, working against the atmospheric opening in the cap 3 of the tank 1, with the liquid contents of the tank 1 between, will immediately suffer the liquid to be elevated to the tank 6, filling same to the maximum height desired in a short time. Then, by closing the valve 8 and stopping the prime mover of the pump and opening valve 32, the contents of the tank 6 is ready for delivery. Should the tank 6 be filled with a greater amount than desired, the excess can be drained back into the tank 1, by opening the atmospheric valve 32 and then opening the valve 8. This will admit air into the tank 6, so that the liquid will flow back down through the pipe 7 and when the level has lowered in the tank 6 to the desired graduation on the scale 10, the valve 8 is closed. Then, by opening the valve 32 and applying the valve 13 to the tank or receiver, and opening said valve 13, the liquid will flow by gravitation from the tank 6, air passing in through the valve 32; or, if it is desired or necessary to deliver the contents of tank 6 by air pressure, rather than by gravity feed, by closing valve 30 and opening valves 34 and 13, valve 8 having been closed, air flows into the tank 6 from tank 15 to displace the liquid and deliver it under desired pressure through the hose 12 to the ultimate container. The pump can thus be used for conveniently elevating the liquid into the measuring tank 6, and it will be noted that the air expelled by the pump is delivered into storage tank 1, thereby consigning any exhaust air or gas to safe disposal.

The apparatus is simple, being composed chiefly of three tanks, piping and valves, and the only operating element is the pump 27 driven by any suitable means. This will eliminate manual effort in dispensing the liquid. The apparatus can therefore be maintained and operated at small expense, and has a dual function in supplying both liquid and air. Inflammable gases or liquid can not escape from the tank 6 into a room or building in which apparatus is located because the tank is closed from the atmosphere, and the only outlet is at the nozzle 13 when delivery is made. The idle gases find their way to the tank 1 and through the vent in cap 3 to the atmosphere outside of the building. This makes the apparatus fire proof as against escaping gases.

For special uses, should it be desirable to install the within system minus the storage tank 15, said tank may be eliminated wholly from the system, and air pressure had direct from the compressor or pump 27 for all purposes. The whole system thereafter from the expulsion port of compressor or pump 27 acting as a restricted storage reservoir or tank.

Having thus described the invention, what is claimed as new is:—

1. In an apparatus of the character described, a liquid storage tank, an elevated measuring tank, a pipe connecting said tanks, for the upward flow of liquid from the storage to the measuring tank, a pump, a pipe connecting said pump and upper portion of the measuring tank for exhausting the air therefrom, delivery means leading from the bottom of the measuring tank for delivering the liquid therefrom, an atmospheric valve for the second named pipe, and means supplied with air from the pump for the delivery of air either to the liquid storage tank or measuring tank for displacing the liquid therefrom.

2. In an apparatus of the character described, a liquid storage tank, an elevated measuring tank, a pipe connecting said tanks for the flow of liquid from the storage to the measuring tank and having a shut off valve, an air pump, an air pipe connecting said pump and upper portion of the measuring tank and having a shut off valve, and also an atmospheric valve, and a delivery hose leading from the bottom of said measuring tank for the discharge of liquid therefrom and having a discharge valve, and means supplied with air from the pump for the delivery of air either to the liquid storage tank or measuring tank for displacing the liquid therefrom.

3. In an apparatus of the character described, a liquid storage tank, an elevated measuring tank, a pipe leading from the storage to the measuring tank, an air pump, a pipe leading from the upper portion of the measuring tank to the pump, a pipe leading from the pump to the storage tank, delivery means leading from the bottom of the measuring tank for the discharge of liquid, and valves for said pipes including an atmospheric valve for the second named pipe.

4. A liquid and air supplying apparatus comprising a liquid storage tank, an elevated measuring tank, a pipe leading from the liquid storage tank to the measuring tank, means leading from the bottom of the measuring tank for the discharge of liquid therefrom, an air pump, a pipe leading from the upper portion of the measuring tank to the air pump for exhausting air from said measuring tank, and having an atmospheric valve for admitting air, an air storage tank, discharge means for the air storage tank for supplying air, and a pipe leading from the outlet of the pump and connected to the air storage and liquid storage tanks, said pipes having valves for controlling the flow of air and liquid.

5. A liquid and air supplying apparatus embodying a liquid storage tank, an elevated measuring tank, a pipe leading from the liquid storage tank to the measuring tank and having a controlling valve, a delivery hose leading from the bottom of the measuring tank for the flow of liquid therefrom, an air pump, a pipe leading from the upper portion of said measuring tank to the air pump for exhausting air from said measuring tank and having valves for controlling the flow of air and admitting air from the atmosphere, an air storage tank, delivery means leading from the air storage tank for supplying air, a pipe leading from the outlet of the pump, and pipes connecting the last named pipe and air storage and liquid storage tanks and having controlling valves for controlling the flow of air from the pump to either storage tank.

6. In an apparatus of the character described, a liquid storage tank, an elevated measuring tank, a pipe leading from the storage to the measuring tank, an air pump, a pipe leading from the upper portion of the measuring tank to the pump, an air storage tank, a pipe leading from the pump to the air storage tank and to the measuring tank, controlling means for said pipes, and discharge means leading from the lower portion of the measuring tank.

7. In an apparatus of the character described a liquid storage tank, an elevated measuring tank, a pipe leading from the storage to the measuring tank, an air pump, a pipe leading from the upper portion of the measuring tank to the pump, an air storage tank, a pipe leading from the pump to the air and liquid storage tanks, a pipe leading from the air storage tank to the upper portion of the measuring tank, delivery means leading from the lower portion of the measuring tank, and controlling valves for said pipes including an atmospheric valve for the second named pipe and a pressure reducing valve for the last named pipe.

8. In an apparatus of the character described, a liquid storage tank, an elevated measuring tank, a pipe leading from the storage to the measuring tank, an air pump, means supplied with air from the pump for delivery of air to the measuring tank to displace liquid therefrom and having controlling means, delivery means leading from the lower portion of the measuring tank, and means in communication with said pump for elevating the liquid from the storage to the measuring tank through said pipe.

In testimony whereof I hereunto set my hand.

WM. C. LINDSAY.